United States Patent
Beausoleil, Jr. et al.

(10) Patent No.: US 8,532,338 B2
(45) Date of Patent: Sep. 10, 2013

(54) SYSTEM AND METHOD FOR COMPENSATING FOR MOTION BLUR IN OPTICAL NAVIGATION

(75) Inventors: Raymond G. Beausoleil, Jr., Redmond, WA (US); Jun Gao, Mountain View, CA (US); Carl E. Picciotto, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1876 days.

(21) Appl. No.: 10/883,846

(22) Filed: Jul. 6, 2004

(65) Prior Publication Data

US 2006/0008170 A1    Jan. 12, 2006

(51) Int. Cl.
*G06K 9/00* (2006.01)

(52) U.S. Cl.
USPC ............ 382/107; 382/103; 382/309; 382/317

(58) Field of Classification Search
USPC ................. 382/103, 107, 309, 317, 112, 151, 382/278; 348/86, 88, 94, 95; 250/559.39, 250/599.39; 271/3.13
See application file for complete search history.

(56) References Cited

U.S. PATENT DOCUMENTS

| | | | |
|---|---|---|---|
| 4,658,935 A * | 4/1987 | Holland | 187/293 |
| 4,864,409 A | 9/1989 | Platte et al. | |
| 4,996,545 A | 2/1991 | Enomoto et al. | |
| 5,089,712 A | 2/1992 | Holland | |
| 5,149,980 A * | 9/1992 | Ertel et al. | 348/88 |
| 5,457,490 A * | 10/1995 | Doane | 348/95 |
| 5,572,433 A * | 11/1996 | Falconer et al. | 700/127 |
| 5,644,139 A | 7/1997 | Allen et al. | |
| 5,729,008 A | 3/1998 | Blalock et al. | |
| 5,875,267 A | 2/1999 | Djakovic | |
| 6,047,132 A | 4/2000 | Maeda | |
| 6,118,132 A | 9/2000 | Tullis | |
| 6,137,967 A * | 10/2000 | Laussermair et al. | 382/112 |
| 6,195,475 B1 | 2/2001 | Beausoleil, Jr. et al. | |
| 6,259,109 B1 * | 7/2001 | Dalmia et al. | 356/429 |
| 6,282,324 B1 | 8/2001 | Leib | |
| 6,295,392 B1 | 9/2001 | Gregory et al. | |
| 6,433,780 B1 | 8/2002 | Gordon et al. | |
| 6,865,288 B1 * | 3/2005 | Shishido et al. | 382/145 |
| 6,891,570 B2 * | 5/2005 | Tantalo et al. | 382/107 |
| 6,955,412 B2 * | 10/2005 | Hin | 347/19 |
| 6,987,530 B2 * | 1/2006 | McConica | 348/208.6 |
| 2004/0170301 A1 * | 9/2004 | Flotats et al. | 382/107 |

FOREIGN PATENT DOCUMENTS

| | | |
|---|---|---|
| EP | 0 899 584 A2 | 3/1999 |
| EP | 0 929 194 A2 | 7/1999 |
| EP | 1 037 020 A2 | 9/2000 |

\* cited by examiner

*Primary Examiner* — Wesley Tucker

(57) ABSTRACT

A method and system for compensating for motion blur in optical navigation adds a correction offset to an image navigation value to adjust for varying velocities along a moving web. Reference and comparison images are acquired at different times from a moving web. An optical navigation value is computed representative of the movement of the web from the reference image to the comparison image. Blur distances for the two images can be calculated. A navigation error correction value is computed as one-half the difference between the reference blur distance and the comparison blur distance. A compensated navigation value is computed by adding the error correction value to the computed navigation value to compensate for varying web velocities.

2 Claims, 8 Drawing Sheets

SYSTEM AND METHOD FOR COMPENSATING FOR MOTION BLUR IN OPTICAL NAVIGATION

BACKGROUND

Various linear operations such as document scanning and printing utilize the synchronization of images relative to a moving web of material. For example, a hand-held scanner can be synchronized to a document being scanned for ascertaining the relative movement between the scanner and the document for accurately picking up an image from the document. Similarly, the movement of paper through a printer can be monitored to more accurately align the transfer of print to the paper. Further, the movement of assembly components along a conveyor belt can be monitored to help ensure timely delivery of components to assembly stations in a device production facility, such as a car manufacturing plant. In each of these examples, the movement of images are tracked along a moving web or plane.

Navigation is a term that has been applied to tracking, or monitoring, the position of images along a moving web. At least a reference image and a comparison image are acquired at different times, and a moving web is tracked or monitored by navigating between the two images. When light beams are used to assist with the tracking and/or monitoring, the process has been called optical navigation, whether or not the light beams are visible to the human eye. One system applying optical navigation to track the movement of a sheet of paper is disclosed in commonly assigned U.S. Pat. No. 5,149,980 to Ertel et al.

While the moving web in the above example is a moving sheet of paper, optical navigation can be also be applied to images being transported along a moving web. One system for measuring the velocity, displacement, and strain along a moving web in an application of optical navigation is disclosed in U.S. Pat. No. 6,118,132 to Tullis. Regardless of the web in use, optical navigation includes one or more image acquisition devices, such as an optical sensor, including a camera, for capturing an image along the web. By subsequent acquiring of images along the web and successively comparing the images to each other, the progress of the web and/or images or objects on the web can be monitored. U.S. Pat. No. 6,195,475 to Raymond G. Beausoleil, Jr. discloses a system for navigating among images captured by a scanning device. Based on the progression of the objects or images along the web, a process, such as document printing or scanning, can be monitored and/or controlled.

Navigation from image to image along a moving web can be complicated by the blurring of the images as captured by an image acquisition device. The blurring is a function of the shutter speed, or exposure time, and the web velocity as an image moves through the field of vision of the image acquisition device while the aperture is open. Shutter speed is understood to be the measurement of time, such as $1/1000$ of a second, that the shutter of an image acquisition device is open for capturing an image. The blurring renders the image less distinct and precise and renders the process of matching between images more problematic; and, accordingly, can introduce errors into the navigation process. The effect of the blurring can be reduced by a slower web velocity and/or by a faster shutter speed, but such choices can reduce throughput or increase system cost. The blurring of the images is further complicated when the web moves at an inconsistent velocity, such as when the web accelerates or decelerates between the times the images are acquired. Under conditions of inconsistent velocity, navigation from image to image becomes more difficult, and navigation errors can increase because of the differing degrees of blurring of the images and the consequential difficulty in matching the dissimilar images to each other. What is needed is a system and method for performing optical navigation.

SUMMARY

Exemplary embodiments are directed to a method and system for compensating for motion blur in optical navigation, including acquiring a reference image from a moving web; acquiring a comparison image from the moving web; computing an optical navigation value between the reference image and the comparison image; calculating an error correction value for the reference and comparison images; and adding the error correction value to the optical navigation value to compute a compensated navigation value for compensating for motion blur on the moving web.

Alternative embodiments provide for a computer-based system for compensating for motion blur in optical navigation, including an acquisition module for acquiring a reference image and a comparison image from a moving web; and a computer configured to determine the velocities of the moving web at the times the reference image and the comparison image were acquired; compute a navigation vector from the reference image to the comparison image; calculate an error correction value; and add the error correction value to the navigation vector to compute a compensated navigation value for compensating for motion blur on the moving web.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements, and.

DETAILED DESCRIPTION OF THE EMBODIMENTS

Figure 1:
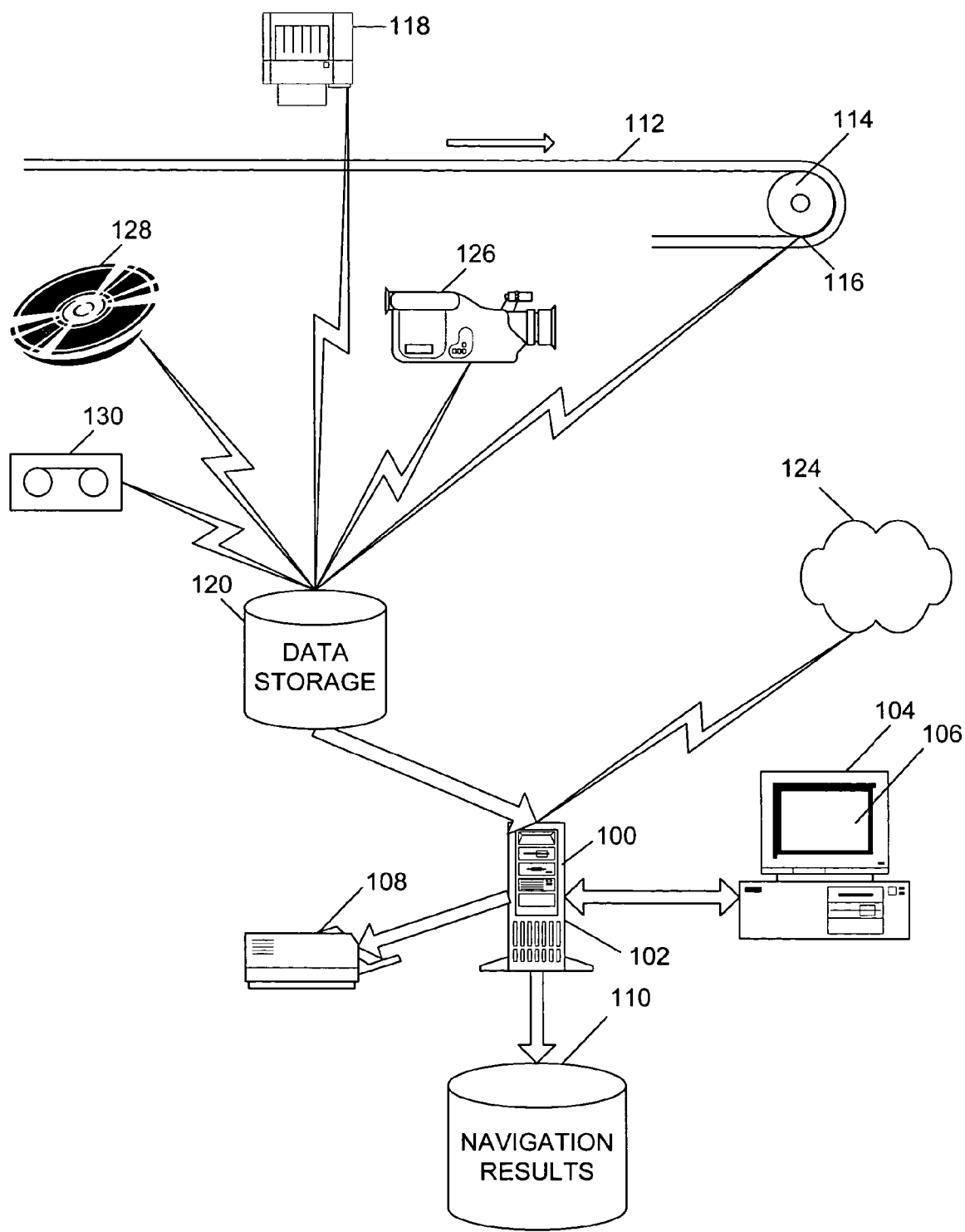
FIG. 1 shows a component diagram of a computer-based system for compensating for motion blur in optical navigation in accordance with exemplary embodiments.

Referring initially to FIG. 1, there is illustrated a computer-based system for compensating for motion blur in optical navigation according to exemplary embodiments. Those of ordinary skill in the art will appreciate that optical navigation can be applied to images and objects in motion. In the context of exemplary embodiments, the term, "web," is intended to include both the object which is being moved relative to an image acquisition device and the surface on which an object is being conveyed. For example, a web can be a sheet of paper being transported through a printer or a scanner and can also include a continuous belt transporting assembly parts in the above example. The web can also be a sheet of material used as part of a web-based fabrication process, such as for printed electronic circuits or roll-to-roll imprinting processes. In such applications, the web can form a part of the finished product, or it can simply be a transporting device. Alternately, the web need not be limited to a moving surface or a sheet of paper and can, for example and not limitation, include a video stream wherein the video images are tracked according to optical navigation. The term "sheet" is intended to broadly encompass a continuous roll of material and a finite page, such as an eight and one-half inches by eleven inches sheet of paper. Further, an image acquisition device includes any device capable of sensing an optical image, including without limitation such devices as still cameras, video cameras, web cams, and photosensors.

Exemplary embodiments can be implemented on a computer 100 having a processor 102, including a personal computer, a network server, a mainframe computer, and the like. Embodiments can further be implemented on embedded microprocessors, microcontrollers, digital signal processors (DSP's), application-specific integrated circuits (ASIC's), and the like. The computer-based system of FIG. 1 shows an image acquisition device such as a camera 118 configured to acquire or capture an image from the surface of a moving web 112. While only one image acquisition device 118 is shown in FIG. 1, two or more image acquisition devices 118 can be utilized to capture images without detracting from the novel features of the exemplary embodiments. Additionally, while the image acquisition device 118 in FIG. 1 appears to be stationary, and the web 112 is shown to be in motion, alternate embodiments provide for a stationary web and an image acquisition device in motion while images are being acquired. Further, embodiments provide for both the image acquisition device and the web to be in motion and not necessarily in the same direction nor at the same velocity.

In one embodiment, a sheet 112 of paper moving through or in front of a printer or scanner comprises the moving web, and an acquired image of the sheet 112 comprises the pixel details of a finite portion of the moving sheet 112 at a reference point in time; i.e. while the image acquisition device shutter is open. Alternatively, any number of image recording devices, such as a video camera 126, can be used to capture multiple images. The resultant acquired images and their corresponding web velocities can be stored on such media as CD's 128 and/or cassette tapes 130. The media upon which the images are recorded can be any known analog or digital media and can include transmission of the images from the site of the image acquisition to the site of the image storage 120 and/or the computer 100. For the convenience of processing the images, the acquired images and the web velocities for the acquired images can also be stored in a memory of a computer 100 or 104 or on a storage device 120 to be subsequently processed by a computer 100 comprising one or more processors 102. Alternately, the acquired images and velocity data can be input to the computer 100 directly from the image acquisition devices 118 and 126 and the media 128 and 130 without detracting from the features of exemplary embodiments.

Exemplary embodiments are compatible with various networks 124, including the Internet, whereby the images can be downloaded across the network 124 for processing on the computer 100. The resultant navigation values can be uploaded across the network 124 for subsequent storage, processing, and/or analysis by a user who is situated remotely from the computer 100.

Reference and comparison images are input to a processor 102 in a computer 100 according to exemplary embodiments. Means for acquiring the images for processing by the computer 100 can include any of the recording and storage devices discussed above and any input device coupled to the computer 100 for the reception of images. The computer 100 and the devices coupled to the computer 100 as shown in FIG. 1 are means that can be configured to acquire and process images for ultimately computing a corrected navigation value to compensate for motion blur according to exemplary embodiments. In particular, the processor 102 in the computer 100 can be a single processor or can be multiple processors, such as first, second, and third processors, each processor adapted by software or instructions of exemplary embodiments for performing compensation for motion blur in optical navigation according to exemplary embodiments. The multiple processors 102 can be integrated within the computer 100 or can be configured in separate computers which are not shown in FIG. 1.

These processor(s) and the software guiding them can comprise the means by which the computer 100 can direct the acquisition of reference and comparison images in addition to recording and calculating web velocities for ultimately computing a compensated navigation value for a comparison image. For example, separate means in the form of software modules within the computer 100 can control the processor(s) 102 for computing an optical navigation value between an initially-captured reference image and a subsequently-captured comparison image, calculating an error correction value for the captured reference and comparison images, and adding the calculated error correction value to the computed optical navigation value to compute a compensated navigation value for the captured reference and comparison images. The computer 100 can include a computer-readable medium encoded with software or instructions for controlling and directing processing on the computer 100 for directing compensating for motion blur in optical navigation.

The computer 100 can include a display, graphical user interface, personal computer 104 or the like for controlling the motion blur compensation process and for viewing the compensation results on a monitor 106. The processor 102 operating under control of exemplary embodiments can output the results of the compensation process, including navigation values, analyses, and statistics, to a printer 130.

Embodiments can also be implemented within the acquisition/capture devices 118 and 126 themselves so that the images can be processed concurrently with, or shortly after, the images being recorded. Further, exemplary embodiments of the motion blur compensation system can be implemented in electronic devices other than the computer 100 without detracting from the features of the system. For example, and not limitation, embodiments can be implemented in one or more components of an image acquisition system, such as in a camera, a VCR recorder/player, printer, scanner, etc.

Figure 2:
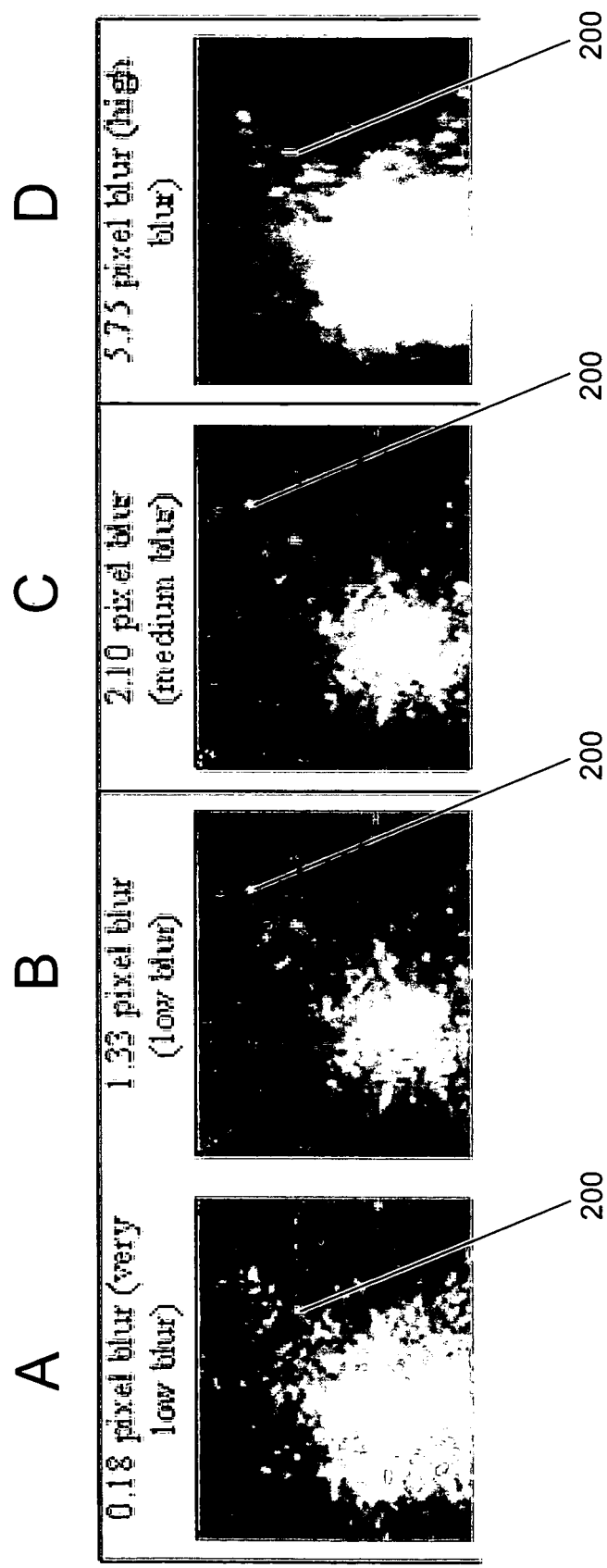
FIG. 2, consisting of FIGS. 2A, 2B, 2C, and 2D, shows four images of the same region along a moving web, the four images each taken at a different exposure speed and/or a different web velocity.

Referring to FIG. 2, there is graphically shown the effect of increasing motion blur on an acquired image. Each of the four figures comprising FIG. 2 shows the same approximate image; in this case a micron-level image of paper fibers and imperfections on a sheet of moving paper. While the pixel size in these images is 7.8 microns, any size pixel can be accommodated by exemplary embodiments of the compensation system because embodiments are not limited by pixel size.

Blur distance is defined for purposes of exemplary embodiments to be the distance an image or a pixel travels along the web during the interval the image acquisition device is acquiring, or capturing, the image. For example, the blur distance (Blur$_R$) of a reference image is the product of the velocity (V$_R$) of the web on which the image is moving and the shutter speed or exposure time (T). The exposure time T can also be called the acquisition time in that this interval represents the time interval during which the image is being acquired.

$$Blur_R = V_R T$$

If the velocity of the web changes between the times that two images, such as a reference image and a subsequent comparison image, are acquired, then the blur distance of the reference image and the blur distance of the comparison image will be different. The difference between these two blur distances is called the differential blur distance, as discussed more thoroughly below.

Figure 3:
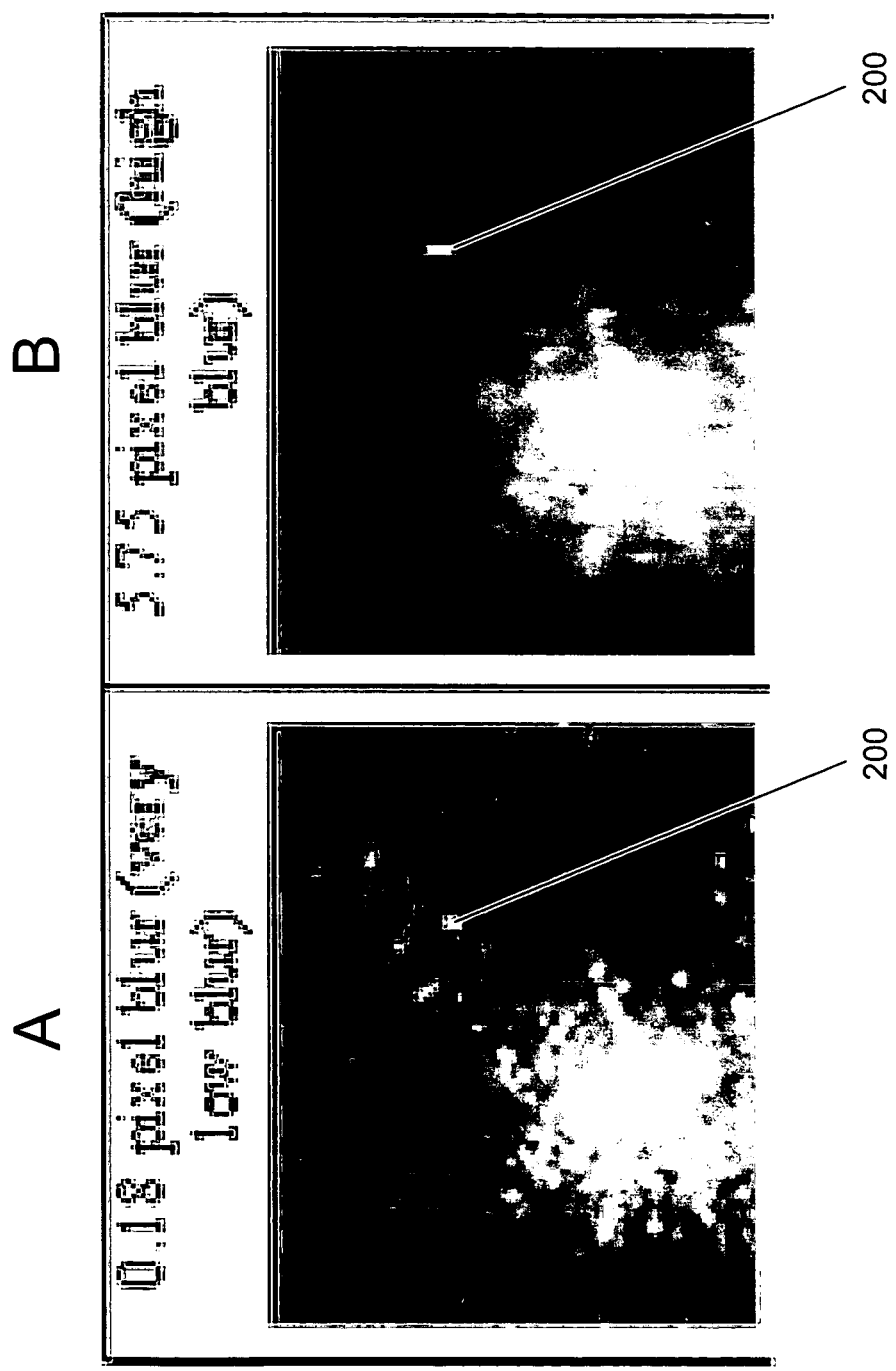
FIG. 3, consisting of FIGS. 3A and 3B, shows enlarged images of FIGS. 2A and 2D, respectively.

In terms of FIG. 2A, the blur distance is shown to be 0.18 pixels, which would be 0.18 (pixel blur) times 7.8 microns (pixel size), or 1.404 microns, and represents the distance the image moved during the time interval the image was being captured by the image acquisition device. The bright dot 200 represents a characteristic of the image that can be used by optical navigation algorithms to navigate along the moving web. As can be seen in FIG. 2D, the bright dot 200 is now more blurred; i.e., its blur distance has increased. In fact, its blur distance is now 44.85 microns (5.75 pixel blur times 7.8 microns per pixel). The additional blur distance is the function of a higher velocity web, a slower shutter speed, or some combination of velocity and shutter speed changes which result in the dot 200 moving approximately 45 microns while the shutter is open; i.e., while the image is being acquired. The difference in blur distance between FIG. 2A and FIG. 2D is shown more clearly in the enlarged versions of these two figures, namely FIGS. 3A and 3B, respectively. As can be seen from FIG. 3B, the motion of the web during the image acquisition period was vertical as shown by the up and down blurring of the dot 200. Exemplary embodiments provide for motion blur compensation for images moving any direction in a two dimensional plane. While optical navigation is applied in a one or two dimensional space, exemplary embodiments are not so limited and can provide for compensation for navigation errors in an n-dimensional space, where n is an integer greater than zero.

Figure 4:
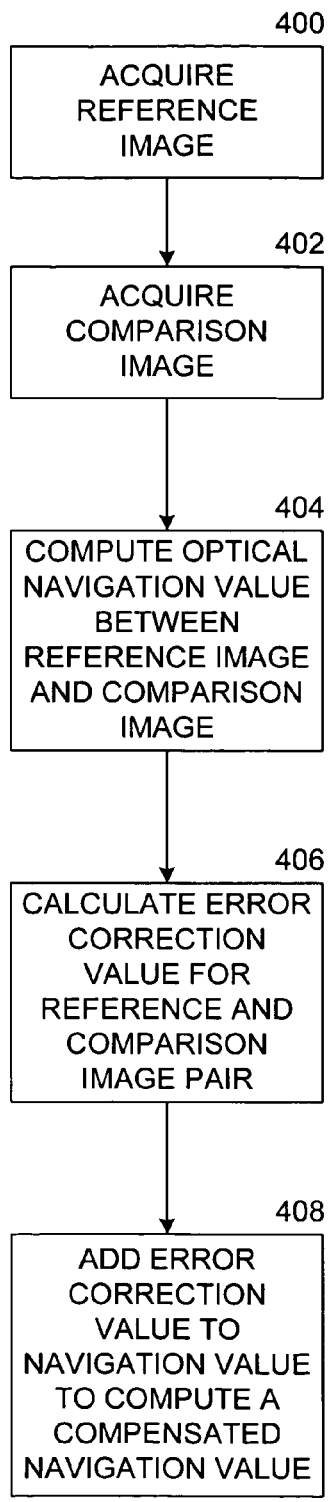
FIG. 4 shows a block flow chart of an exemplary method for compensating for motion blur in optical navigation.

Referring briefly to FIG. 4, there is shown a flow chart of a method for compensating for motion blur according to an exemplary embodiment. A reference image is acquired from a moving web 112 at step 400. At step 402, a second, or comparison, image is acquired from the web 112. An optical navigation value is computed between the reference image and the comparison image at step 404. At step 406, an error correction value is calculated for the reference and comparison image pair. Finally, at step 408, the calculated error correction value is added to the computed optical navigation value to compute a compensated navigation value for the reference and comparison image pair.

Figure 5:
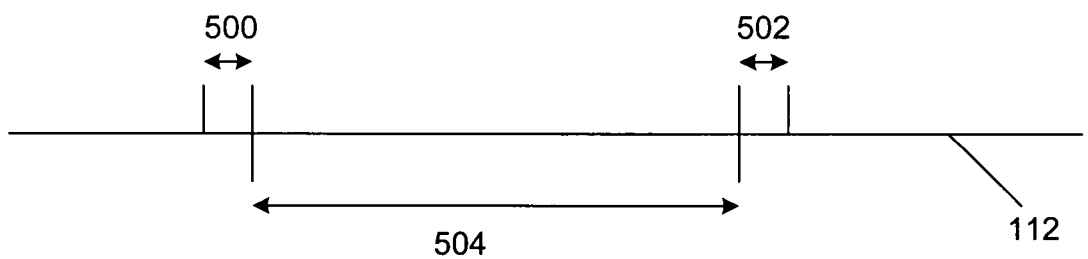
FIG. 5 shows a timeline along a moving web showing the acquisition of reference and comparison images.

The acquisition interval T$_R$ for the acquisition of the reference image is shown at 500 along the moving web 112 timeline shown in FIG. 5. The comparison image acquisition interval T$_C$ is shown at 502. The time interval, I, representing the elapsed time between the acquisition of the reference image and the comparison image is shown at 504.

Figure 6:
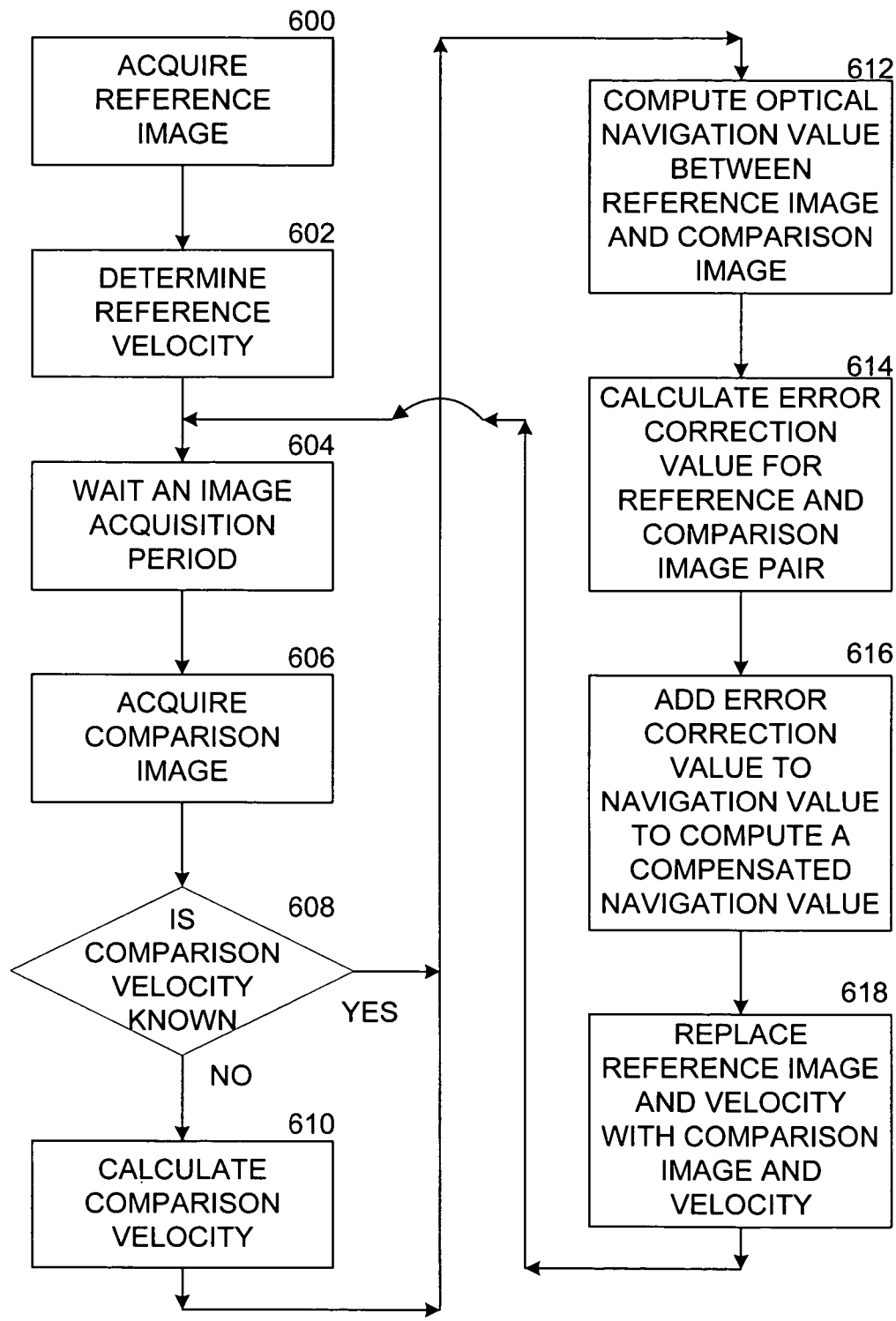
FIG. 6 shows a block flow chart of an exemplary method for compensating for motion blur in optical navigation.

Referring now to FIG. 6, there is shown a flow chart of a method for compensating for motion blur according to another exemplary embodiment. At step 600, a first, or reference, image is acquired by means of an image acquisition device 118 from a moving web 112. As discussed above, the image acquisition device 118 can be moving in relation to the web 112. Further, exemplary embodiments can be applied to a video stream where the web 112 is the video stream in motion, and an image from the video stream is captured by an image acquisition device 118. A first velocity of the web 112 is determined at step 602 at the time the reference image is captured. This reference velocity is the relative speed differential between the motion of the image acquisition device 118 and the web 112. In the situation where the image acquisition device 118 is stationary, and the web is in motion, the velocity can be recorded by means of an encoder wheel 116 near the drive shaft 114 of the web 112. However, exemplary embodiments are not limited to the velocity measurement devices shown in FIG. 1 and can include any known system for providing velocity measurements within an acceptable range of accuracy. Achieving targeted accuracy ranges is discussed below in conjunction with calculations of a standard deviation of errors attributable to velocity measurements.

At step 604 an interval of time 504 is allowed to elapse, under control of the computer 100 or a timing device, between image acquisition device shutter openings or successive image acquisitions. Alternately, a predetermined web distance passes in front of the image acquisition device 118 before the next image is acquired by the image acquisition device 118. At step 606 a second image, termed a comparison image, is captured by the image acquisition device 118. A check is made at step 608 for determining whether a second, or comparison, velocity is known. The comparison velocity is the relative speed of the web 112 to the image acquisition device 118 at the time the comparison image is taken. The comparison velocity can be determined in a manner similar to the reference velocity. If the comparison velocity is not known, it can be calculated at step 610, knowing the time interval between the reference and comparison images and knowing the relative acceleration of the web between the times the images were acquired. The relative acceleration is the net acceleration, or increase in velocity per time interval, between the times the reference and the comparison images were acquired. If the relative acceleration is a negative number, then the web experienced a net deceleration in velocity during this interval of time 504 between image acquisitions. The accelerations, decelerations, and times of either can be recorded using known methods sensing the velocity and changes of velocity of the web 112 and/or image acquisition device movement. For example, for a constant acceleration (a) during the image acquisition interval (T$_C$), the velocity (V$_C$) at the time of the acquisition of the comparison image can be calculated as:

$$V_C = V_R + aT_C$$

Where a series of accelerations and decelerations have occurred during the image acquisition interval, the comparison velocity can be calculated as:

$$V_C = V_R + (a_1 T_1 + a_2 T_2 + \ldots + a_n T_n)$$

where a$_i$ is the acceleration (or negative acceleration in the case of deceleration) for a period of T$_i$, where T$_1$+T$_2$+ ... +T$_n$=T. For the situation where the acceleration of the web is varying continuously during the image acquisition interval, the comparison velocity can be calculated according to the following formula:

$$V_C = V_R + \int_0^T a(t) dt$$

At step 612, an optical navigation value for the movement of the web from the reference image to the comparison image is computed using known methods of optical navigation. For example, the optical navigation value can be computed by performing pixel-by-pixel correlations between the reference image and the comparison image and then generating an image offset vector using a maximum-likelihood function. In the absence of any change in velocity of the web 112 during the interval of time 504 between the acquisition of the reference image and the acquisition of the comparison image, the optical navigation value can be used to determine a new location for the reference image on the moving web. For example, and not limitation, exemplary embodiments can be utilized in printers where ink is directed onto a sheet of paper as the paper moves through the printer. In these print applications, the optical navigation value is used as feedback to the printer to indicate how far a pattern identified on the paper in the reference image has moved; and, accordingly, how far the paper has advanced through the printer. This navigation information is used by the printer to determine how much farther to advance the paper prior to printing particular information onto the paper and/or to determine which information is to be printed on a particular portion of the paper as it advances through the printer.

At step 614, an error correction value is calculated for the reference and comparison images to compensate for the change in velocity from the reference image to the comparison image, as will be discussed more detail in conjunction with FIG. 7.

Exemplary embodiments are not limited to any particular method for navigating between images or for producing optical navigation values between images. Once a navigation value has been determined between two acquired images, exemplary embodiments can calculate an error correction value for compensating for changing web velocities and the consequential changing motion blur along the moving web. The optical navigation value can be, for example and not limitation, a one or more dimensional vector having a direction and magnitude showing the movement or offset from the reference image to the comparison image. For example, in a three dimensional web space, the vector can provide for three directions of movement plus a magnitude of movement.

Figure 7:
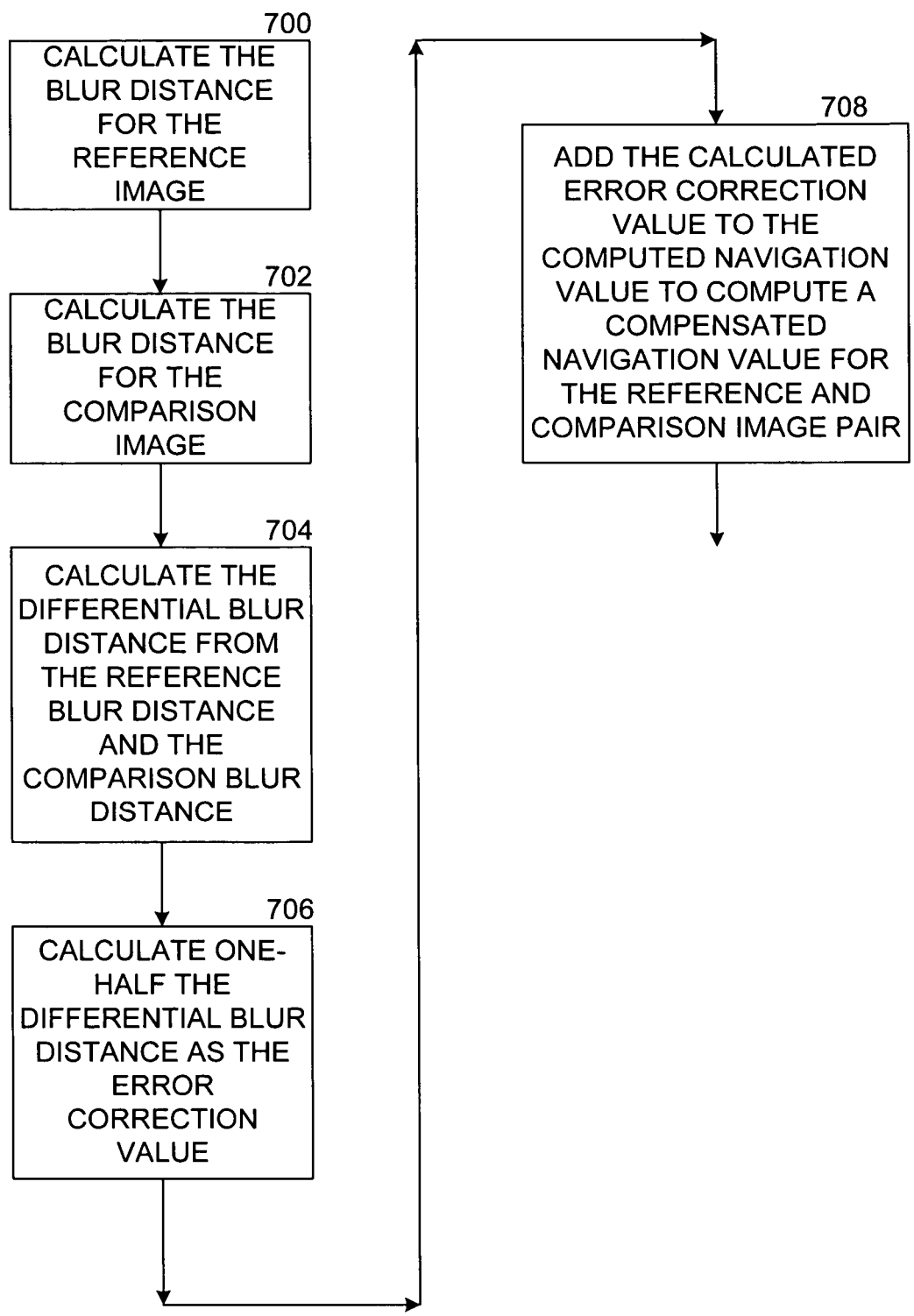
FIG. 7 shows a block flow chart of an exemplary method for calculating an error correction value for compensating for motion blur in optical navigation.

Referring now to FIG. 7, there is shown an exemplary method for calculating a motion navigation error correction value. The blur distance for each image is defined to be the distance an image pixel travels in the direction of the moving web during the time interval the image is being captured by the image acquisition device. At step 700 the blur distance is calculated for the reference image by multiplying the reference velocity by the shutter speed or image acquisition time according to the following formula:

$$Blur_R = V_R T$$

The comparison blur distance is calculated at step 702 according to a similar formula:

$$Blur_C = V_C T$$

where $V_C$ is the velocity of the web at the time the comparison image was acquired.

At step 704, the differential blur distance for the comparison image is calculated by subtracting the comparison blur distance from the reference blur distance. The result of step 704 is multiplied by an error correction fraction of 0.5 (alternately written as ½) in step 706 to obtain one-half the differential blur distance as the navigation error correction value attributable to web velocity changes during the image acquisition interval. Accordingly, the error correction algorithm can be represented as:

$$\text{Error Correction Value} = \frac{1}{2} \text{Differential Blur Distance}$$
$$= \frac{1}{2}(V_R - V_C)T$$

While the above error correction algorithm presumes the image acquisition times for the reference image and the comparison image to be the same, exemplary embodiments are not so limited. Therefore, under circumstances where the reference image acquisition time, $T_R$, and the comparison image acquisition time, $T_C$, are not equal, the error correction algorithm can be represented as:

$$\text{Error Correction Value} = \frac{1}{2}(V_R T_R - V_C T_C)$$

While one-half the differential blur distance is utilized in this exemplary embodiment as the navigation error correction value, other fractional values of the differential blur distance can be utilized as an error correction value, as discussed more thoroughly below in conjunction with the Taylor series proof offered with equations (2)-(5).

At step 708, the calculated error correction value is added to the computed optical navigation value to compute a compensated navigation value for the reference and comparison images, thereby compensating for the effect of acceleration and accordingly reducing the navigation error from the reference image to the comparison image. As can be seen from the above discussion and referring back to the discussion regarding FIG. 2, the compensated navigation value can be a subpixel predictor for the distance between the reference image and the comparison image on the moving web. The compensated navigation value can be utilized in the same manner as discussed above in conjunction with step 612 regarding the optical navigation value for determining a new location for a reference image on the moving web where the web is not moving at a constant velocity.

Exemplary embodiments are not limited to a 1, 2, or 3-dimensional space in which moving images can be monitored and/or controlled. Embodiments can provide for compensating for motion blur in a moving web of an n-dimensional space where the computed optical navigation value and the computed compensated navigation value can be, for example, n-dimensional vectors which include a magnitude of movement.

Objective support for the calculation of the error correction value can be shown as follows. Suppose that the gray scale image value registered by a particular sensor pixel when the web is at rest is $p_0$. If the web is moving along the x-axis, then the sensor pixel will record an intensity that is the time average of the pixels observed while the shutter is open for a time T:

$$\langle p \rangle_T = \frac{1}{T} \int_0^T dt\, p[x(t)]. \tag{1}$$

Expanding the integrand in a Taylor series, $$p[x(t)] = p(0) + \frac{dp}{dx}\bigg|_0 x(t) + \frac{1}{2}\frac{d^2 p}{dx^2}\bigg|_0 x(t) + \ldots . \tag{2}$$

Therefore, assuming that $$\frac{dp}{dx}\bigg|_0 \gg \frac{1}{2}\frac{d^2 p}{dx^2}\bigg|_0 x(t), \tag{3}$$

the following results:

$$\langle p \rangle_T \cong p(0) + \frac{dp}{dx}\bigg|_0 \frac{1}{T}\int_0^T dt\, x(t) \quad (4)$$

$$\cong p(0) + \frac{dp}{dx}\bigg|_0 \langle x \rangle_T$$

$$\cong p[\langle x \rangle_T]$$

where in the final expression the Taylor expansion of p[x] near 0, displaced by $\langle x \rangle_T$, is expressed. The blur over the distance $\langle x \rangle_T$ will not significantly affect the ability to navigate over a region of an image if the product of the Laplacian and the distance is significantly smaller than the gradient in that region.

Finally, to address the ½-blur-distance compensation for differential blur, recall the expression above:

$$\langle p \rangle_T \cong p[\langle x \rangle_T] \quad (5)$$

This expression indicates that, for small distances, the light intensity integrated by the pixel over the exposure-period T is approximately equivalent to the intensity observed at the average paper displacement during the time period T. Assuming a constant paper velocity during this time period, the average displacement is equal to ½ the displacement, or ½ the blur distance. Hence, optical navigation will tend to produce a ½-blur-distance offset.

It should be noted that the approximation or assumption represented in equation (3) need not hold in all cases, particularly applications that involve longer, or greater, blur distances. For example, in those cases where the reference and/or comparison image acquisition times are relatively long and/or the velocity of the web is changing during these image acquisition times, blur and differential blur can be introduced during the acquisition of these images. Accordingly, the error correction fraction of one-half may no longer provide optimum results for compensating for motion blur. In such cases, the Taylor series of equation (2) can be expanded to more terms before being truncated and incorporated into equation (4). Those skilled in the art will then be able to derive alternative expressions through to equation (5) and, accordingly, derive alternative blur compensation correction fractions. For example, the error correction fraction can be a value other than one-half and can be a value between 0.0 and 1.0. For example, the range of possible error correction fractions can be 0.05-0.95.

Figure 8:
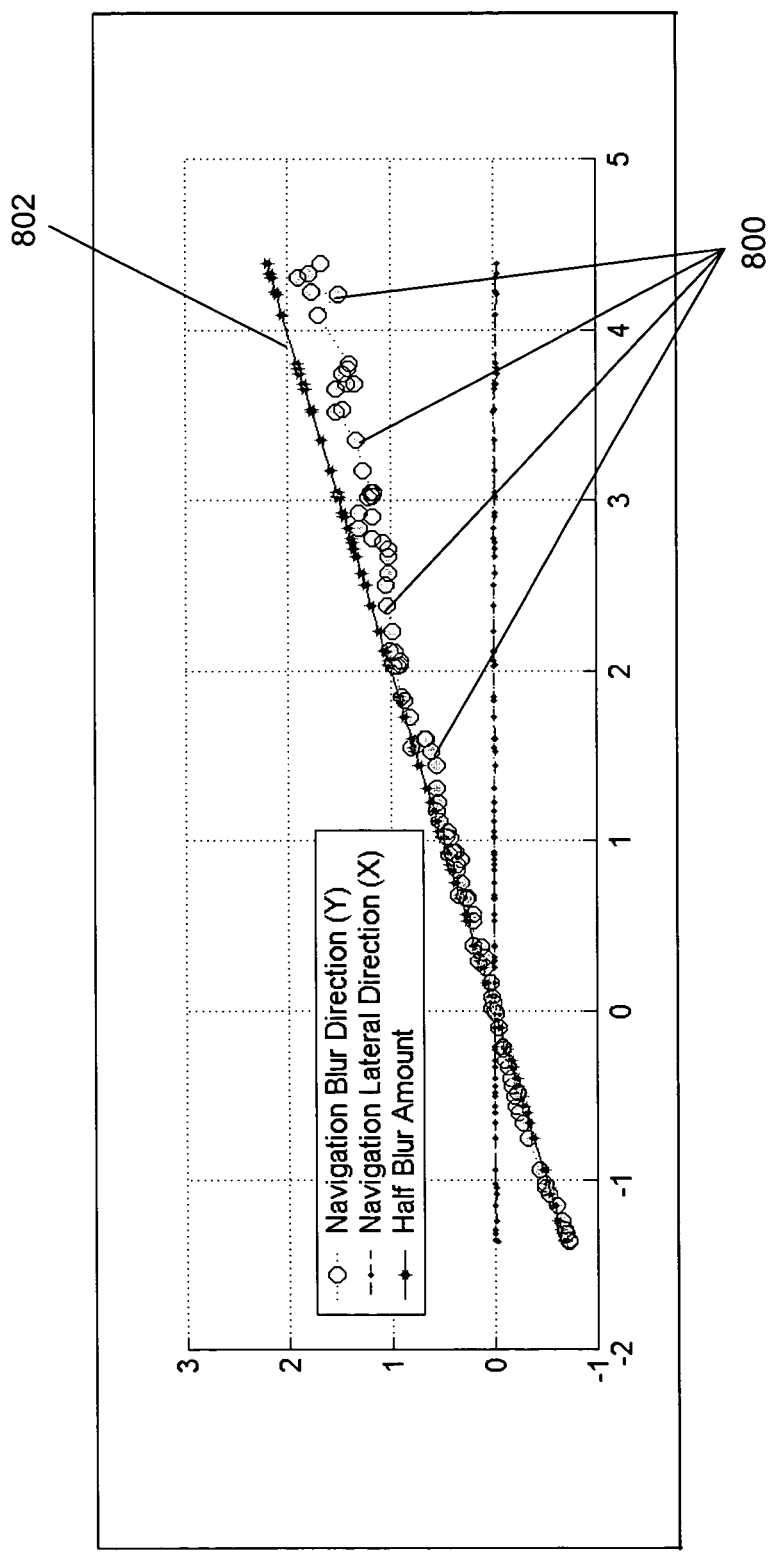
FIG. 8 shows a graph of experimentally-derived navigation results versus motion blur difference distances, plotted against an exemplary half-blur distance line.

Experimentation has verified the efficacy of the present approach for compensating for errors due to differential motion blur with an offset given by one-half the blur distance difference. Referring now to FIG. 8, there is shown a graph of compensated navigation blur values according to exemplary embodiments, where the graph details the results of a series of navigations performed on a set of paper images. The scale of the x and y-axes is in pixels. The images were acquired by a fixed camera aimed perpendicularly at paper translating in the y-axis. The paper moved back and forth along the y-axis, and the camera was configured to trigger its image acquisition at a particular patch of paper, but only when the paper was traveling in one particular direction. The resultant images were blurred because of the camera exposure times. Thus, every image in the set contained the same patch of paper, blurred in the same direction. By varying the speed of the paper translations, all the images in the set experienced differing motion blur distances. One of the images in the set was chosen at random to be the reference image, and all the other images were navigated against it.

In a perfect, noiseless, blur-less environment, one would expect the navigation results to all be of zero magnitude, since all the images would be of the same patch of paper without blur. With varying motion-blur distances, however, one would expect, according to exemplary embodiments, to see navigation errors equivalent to one-half the blur distance difference between the reference image and each corresponding comparison image. FIG. 8 shows a graph of experimentally-derived navigation results 800 versus motion blur distance differences, plotted against an exemplary half-blur distance line 802. The horizontal axis gives the motion blur difference in pixels, and the vertical axis gives the navigation results in units of pixels. As can be seen from the figure, the actual navigation values correlate closely with the one-half blur distance difference line 802, thereby supporting the postulation behind exemplary embodiments of the present navigation compensation system.

Step 708 corresponds to step 616 of FIG. 6. At step 618, the reference image and the reference velocity are replaced respectively by the comparison image and the comparison velocity. Processing branches back to step 604 to await the acquisition of the next comparison image as navigation from image to image proceeds. The navigation and navigation error compensation process continues as shown in FIGS. 6 and 7 until the object or flow being navigated completes or stops or until the process is stopped by a user.

Once the navigation compensation process has completed for a particular moving web and series of images, the product of the navigation compensation process can be the vector sum of the individual navigation results, tracking the movement along the n-dimensional web space from the initial reference image to the final comparison image, adjusting for changing velocities and/or accelerations/decelerations of the web. The compensated navigation values more accurately show the movement of images along a moving web where the web speed is not constant. In an alternate embodiment, a reference image and velocity can be retained for several iterations of steps 604-618 to accommodate rapid changes in velocity and direction along the moving web.

Exemplary embodiments provide for determining the instantaneous velocities, $V_c$ and $V_r$, of the moving web at the times the reference and comparison images are acquired. If the determined and/or calculated velocities are inaccurate, as modeled by the respective additive error terms, $\epsilon_{vc}$ and $\epsilon_{vr}$, the error correction, or offset, algorithm can additionally be represented as:

$$\text{Offset with Imperfect Velocity Estimates} = \tfrac{1}{2}((V_r + \epsilon_{vr}) - (V_c + \epsilon_{vc}))T \quad (6)$$

The over-all error to the correction offset is then the difference between the two algorithms, or:

$$\text{Offset Error} = \tfrac{1}{2}(\epsilon_{vr} - \epsilon_{vc})T \quad (7)$$

Applying a statistical evaluation to the offset error and presuming that the distributions of $\epsilon_{vc}$ and $\epsilon_{vr}$ are the same, with a standard deviation of:

$$\text{Standard Deviation of Offset Error} = \frac{\sqrt{2}}{2} T\, \sigma_{\epsilon v} \quad (8)$$

$$= \frac{T\, \sigma_{\epsilon v}}{\sqrt{2}} \quad (9)$$

Solving for $\sigma_{\epsilon v}$:

$$\sigma_{\epsilon v} = \text{Desired Standard Deviation Of Offset Error} = \frac{\sqrt{2}}{T} \quad (10)$$

For example, if the exposure time T is 100 µs, and the navigation error target is to keep the standard deviation of the differential-blur compensation error due to errors in velocity measurements to less than 0.1 µm, the standard deviation of the errors of each of the two velocity measurements must be kept below $$\frac{\sqrt{2}}{100 \, \mu s} 0.1 \, \mu m,$$

or 1.4 mm/s, or 0.056 inches per second. Note that to satisfy tighter error distribution requirements, such as a 3-σ error distribution required for many manufacturing applications, equation (10) can be scaled accordingly by known methods. Instrumental errors, which are repeatable measurement-to-measurement deviations, have, by definition, zero-valued standard deviations but finite mean values. It is possible that such instrumental errors can still exist even after equation (10) has been scaled for tighter error distributions. However, since such instrumental errors are constant, removing these errors from the calculations is easily accomplished once the errors are identified through system calibration.

Exemplary embodiments can modify the exposure time or shutter speed and the accuracy of the velocity measurements to compute compensated navigation results within targeted accuracy ranges. For example, the exposure time can be shortened and/or the accuracy of the encoder wheel 116 can be increased to provide targeted compensated navigation accuracy results.

Although exemplary embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A system for compensating for motion blur in optical navigation, comprising:
    means for acquiring a reference image from a moving web;
    means for acquiring a comparison image from the moving web;
    means for determining a first velocity of the web at the time of acquisition of the reference image;
    means for determining a second velocity of the web at the time of acquisition of the comparison image;
    means for computing a navigation value between the reference image and the comparison image;
    means for calculating an error correction value for a difference between the first velocity and the second velocity; and
    means for adding the navigation value and the error correction value to compute a compensated navigation value for compensating for motion blur on the moving web.

2. The system according to claim 1, wherein the compensated navigation value is an n-dimensional vector comprising direction and magnitude of web movement from the reference image to the comparison image and wherein n is an integer greater than zero.

* * * * *